United States Patent [19]
Jain

[11] Patent Number: 5,518,696
[45] Date of Patent: May 21, 1996

[54] EMERGENCY SCRUBBING SYSTEM

[76] Inventor: Roop C. Jain, 7875 Norcanyon Way, San Diego, Calif. 92126

[21] Appl. No.: 232,203

[22] Filed: Apr. 28, 1994

Related U.S. Application Data

[63] Continuation-in-part of Ser. No. 783,178, Oct. 28, 1991.
[51] Int. Cl.⁶ .................................................. B01D 50/00
[52] U.S. Cl. ........................... 422/171; 422/177; 55/229;
55/249; 55/210; 55/220; 55/233; 55/260;
169/54; 169/70; 261/17; 261/DIG. 19
[58] Field of Search .................................. 422/171, 168,
422/170, 177; 55/229, 257.1, 249, 89, 93;
261/17, DIG. 19; 423/241, 473; 169/54,
70

[56] References Cited

U.S. PATENT DOCUMENTS

| | | | |
|---|---|---|---|
| 3,739,551 | 6/1973 | Eckert | 55/90 |
| 4,110,088 | 8/1978 | Cold et al. | 55/90 |
| 4,207,290 | 6/1980 | Lee | 422/109 |
| 4,419,331 | 12/1983 | Montalvo | 422/170 |
| 4,574,076 | 3/1986 | Castranas | 423/224 |
| 4,609,386 | 9/1986 | Sibley et al. | 55/223 |
| 4,702,178 | 10/1987 | Welsh | 110/193 |
| 4,999,167 | 3/1991 | Skelly et al. | 422/175 |
| 5,086,804 | 2/1992 | Ngai | 137/312 |
| 5,147,429 | 9/1992 | Bartholomew et al. | 55/356 |
| 5,277,822 | 1/1994 | Higgins | 210/673 |
| 5,330,725 | 7/1994 | Mumalo | 422/170 |

*Primary Examiner*—Nina Bhat
*Attorney, Agent, or Firm*—William Patrick Waters

[57] ABSTRACT

An emergency scrubbing system guides rapidly escaping noxious fluid under pressure along an irregularly shaped non-linear delay path of travel, and admits a treating substance to the fluid to provide a preliminary treatment therefor to help neutralize the fluid. The preliminarily treated fluid is then treated at the exit end of the delay path for providing a final treatment before releasing it to the atmosphere. The final treatment is prepared as the fluid flows through the delay path for a predetermined period of time substantially equal to the length of time required for the fluid under pressure to flow through the delay path.

21 Claims, 8 Drawing Sheets

EMERGENCY SCRUBBING SYSTEM

CROSS-REFERENCE TO RELATED APPLICATIONS

This application is a continuation-in-part application of U.S. patent application Ser. No. 07/783,178, filed Oct. 28, 1991.

TECHNICAL FIELD

The present invention relates generally to scrubbing systems, and more particularly to an emergency scrubbing system and method for treating a sudden inundation of high concentrations of noxious or corrosive fluids.

BACKGROUND ART

Gas scrubbing systems for removing unwanted constituents from gas streams are utilized in many different industries such as the chemical and paper industries, water and waste water treatment plants, and other applications where unwanted constituents are present in a process gas. The scrubbers are designed to treat the gas before it is released into the atmosphere. In this manner, unwanted constituents may be removed, or neutralized, before the gas is released.

In general, such scrubbing systems are utilized under conditions in which predictable volumes of gas are passed therethrough for treatment. Such systems, however, are not at all suitable for removing unwanted noxious fluids when they are released in large concentrations, under explosive conditions, such as during the accidental explosive release of a noxious fluid under pressure. In such cases, conventional scrubber systems are unable to reduce the level of unwanted constituents to tolerable levels within a sufficiently short period of time.

It is well known that compressed noxious fluids such as chlorine, ammonia, sulfur dioxide and hydrogen chloride gases are used extensively in a variety of industrial applications. Chlorine, for example, is widely used in chemical industries and in water treatment plants. These gases, while having substantial utility in industrial processes, present serious health problems, sometimes life threatening, if they are released in an uncontrolled manner. Thus, it is very important in the utilization of such gases to consider requirements for prevention, control and mitigation of dangerous conditions relating to their use.

In recognition of safety considerations, cylinders containing a noxious gas are often stored in a ventilated enclosure such as a gas cabinet, or storage room. Such an enclosure is generally maintained normally at a negative pressure in relation to the surrounding area to reduce the likelihood of leakage of a corrosive gas from the storage area. It is recognized that when a leak from a pressurized cylinder occurs, room pressure rises because of the added vapor therein. Thus, to maintain a negative pressure in the room or cabinet, a ventilation exhaust rate must be established that is higher than the gas vapor generation rate. In some situations, when the leak rate is not substantial, this can be accomplished by exhausting the air through a conventional scrubber, before it is vented to the atmosphere. However, conventional scrubbers are unable to handle large concentrations of noxious gas, released in a very rapid manner.

Thus, it is recognized that under emergency conditions, when very large volumes of noxious fluids are explosively released inadvertently, a suitable emergency system must be capable of reducing the discharge concentration of the escaping fluid to an acceptable level within a very short period of time. This level, representing the concentration of airborne contaminants, is normally expressed in parts per million (ppm). In the case of chlorine, for example, the maximum acceptable chlorine concentration, at the exit of an emergency chlorine treatment system, is generally regarded to be about 15 ppm.

Conventional scrubber systems are capable of reducing chlorine concentrations in an enclosure to the 15 ppm level when a small leak is involved. However, such systems are not capable of processing an enclosure having very large concentrations of chlorine, when the chlorine is released in an explosive manner from large storage cylinders. In this regard, when establishing emergency system performance criteria, the entire content of a tank or cylinder must be considered.

In many commercial applications, a cylinder containing about 2,350 pounds of liquified chlorine is used. In general, the cylinders are constructed of steel and are equipped with one or more pressure relief devices. It is known that, in spite of careful design of such containers, leaks occur because of human error or because of failure of some component in the storage system. However, leaks occurring through valve packing, threads, gaskets and valve seats generally do not result in catastrophic failures and may not require the use of an emergency scrubbing system. However, when chlorine release is the result of valve failure, a blown fusible plug or puncture of a cylinder wall, large volumes of liquid and gaseous chlorine are released in a very short time. The results can be life threatening for those in the vicinity of the spill. In such cases, the chlorine contaminated enclosure and surrounding areas must be treated immediately on an emergency basis.

To date, attempts have been made to adapt conventional techniques to an emergency release situation. In this regard, a dilution/dispersion technique has been considered wherein contaminated air from a storage room is vented through an exit stack to the atmosphere, without any scrubbing or chlorine neutralization. The exit gas stream entrains ambient air, thereby diluting the chlorine concentration.

Such a method may protect local plant personnel in the immediate vicinity of the storage room. However, it is unacceptable for many applications, since it presents a dangerous condition to the health of people living downwind of the plant. As a result, such a technique is incompatible with public safety and is often prohibited by ordinance.

A recycling chlorine scrubber system is another proposed method for attempting to solve the problem. In this system, air is withdrawn from the storage room at a rate higher than the chlorine vapor release rate, passed through a scrubber for chlorine removal and then recycled back to the storage room.

However, the technique presents several serious drawbacks due to the highly corrosive characteristics of the fluid to be treated. By recycling air from the scrubber, severe corrosion to equipment in the storage room can occur. In addition, it is difficult to maintain negative pressure in the room and, as a result, corrosive gas leakage from the storage room may occur, thereby threatening the health of personnel in the vicinity of the room. Thus, the recycling type of scrubber is not suitable for the emergency condition for many applications.

In contrast to recycling systems, once-through emergency scrubbing systems have also been considered. In such systems, storage room air is exhausted through a scrubber for removal of noxious gas, such as chlorine, before it is vented to the atmosphere. In such cases, the exhaust rate must be greater than the highest chlorine vapor generation rate to assure that a negative pressure is maintained in the storage room and to prevent unwanted chlorine vapor from escaping to the atmosphere.

This technique is relatively simple in operation, but it requires a very efficient scrubber system, having a removal efficiency greater than 99.998%, in order to maintain chlorine levels at 15 ppm at the scrubber exit. Such scrubber efficiencies have been heretofore unknown in conventional scrubbing systems of any kind.

In view of the foregoing, while a once-through system has attractive features, the high efficiency requirement presents a substantial limitation. In view of this fact, it would be highly desirable to have an emergency scrubber having the advantages of a once-through system, with very high scrubber efficiencies capable of safe and economic operation.

In addition to the above described techniques, other conventional scrubbers utilize a packed tower having an induced draft fan to exhaust the storage room air. The packed tower is often a counter flow vertical tower having random packing which is irrigated at the top with a caustic solution. Such a system usually requires an unduly large size system for some applications. Also, because of the height of such conventional packed towers, a time delay of a minute or two may be required for the caustic solution to wet the packing completely. Of course, until the packing is wetted, it does not contribute to the scrubbing of the noxious fluid. Therefore, during this initial wetting period when scrubbing requirements are at the highest, scrubber efficiency is very low. Thus, the packed tower system is not acceptable for many applications.

Another conventional approach is to use an ejector Venturi to evacuate the storage room. Typically, the Venturi is mounted over a tank containing caustic reagents and discharges into the tank. In the event of a leak of noxious fluid, such as chlorine leak, a high pressure pump injects a high flow of caustic solution into the Venturi throat, thereby creating a suction and causing the air flow out of the storage room. The caustic solution atomizes into drops providing surfaces for chlorine absorption. Most injected caustic solution is separated from the gas stream by impacting on the liquid surface in the tank and by gas flow direction changes.

A severe disadvantage of such a system is low chlorine removal efficiency. The short contact time in the ejector and large liquid drops formed therein results in a chlorine removal efficiency of a conventional ejector Venturi of between about 70–80%. Such a level of performance is unacceptable in emergency conditions. In an attempt to overcome the low removal capability, ejector Venturis technique are sometimes utilized in combination with a recycling system. This approach, however introduces the severe drawbacks of recycling systems.

In some conventional systems, a packed tower is added downstream of an ejector Venturi in an attempt to improve the scrubbing operation. Although this design may eliminate some of the shortcomings of a recycling system, the packed tower in such applications must be undesirably large in size. For instance, since chlorine vapor concentration can be as high as about 800,000 ppm during the first minute of a catastrophic failure, if the ejector removal is 80%, the chlorine concentration at the packed tower inlet is about 160,000 ppm.

In order to reduce the vapor concentration to the desired 15 ppm at the outlet, the required removal efficiency for the packed tower would require a tower height exceeding 11 feet. Such a system is not only expensive to manufacture, it occupies unreasonably large areas for some applications.

Another important factor to be considered is the nature of the neutralization reaction which is usually exothermic, thereby producing substantial amounts of heat in a very short time period when chlorine, for example, reacts with a caustic substance. In such cases, "hot spots" can develop, as gas flows through system ducts, because of a concentration of the gas near the center of the duct. This causes an uneven flow distribution within the duct, and an inefficient scrubbing operation, because the caustic reagent is incapable of reacting uniformly with the chlorine gas. An ineffective and incomplete reaction is thus realized.

Another critical factor to be considered is the fact that the extremely high concentrations of the rapidly escaping chlorine gas flowing through the scrubbing system could be many times greater than a lethal dosage. Thus, should the gas escape from the scrubbing system, people in the vicinity of the scrubbing system would be in grave danger of losing their lives. In the event of an unwanted leak or other similar type of malfunction, in the emergency scrubbing system, personnel within the plant would be exposed to life threatening conditions.

Similarly, should the emergency scrubbing system fail or otherwise malfunction, such as by the bursting or leaking of the treatment conduits, the system would be unable to function to such an expected high degree of efficiency and effectiveness. Also, a bursting or leaking treatment conduit can cause dangerous treating fluids, such a caustics, to be sprayed in the direction of personnel within the immediate vicinity, thereby causing another unwanted threat to human life.

A still further consideration in the design of an emergency scrubbing system, is the provision of an expensive emergency electrical power generation subsystem. Such subsystems are very expensive, due to their fail-safe design. Thus, it would be highly desirable to have a new and improved emergency scrubbing system, which can be operated electrically from smaller, less expensive emergency electrical power generation subsystems.

In view of the foregoing, it would be highly desirable to have an efficient and effective emergency fluid scrubbing system which could combine extremely high efficiency of operation with a relatively compact low height size to render safe and harmless massive concentrations of rapidly expanding lethal fluids, such as chlorine gas. Such an emergency scrubbing system would protect people in the vicinity of the inadvertent and unwanted massive release of the explosive fluid. In the case of chlorine gas, inhaling a few breath of a high concentration, such as about 1,000 ppm, of the gas could in at least some situations, cause immediate death, or at least serious bodily injury. It is possible that an explosive release of chlorine gas could result in many times higher concentrations, such as about 400,000 ppm.

Thus, a new and improved emergency scrubbing system should be about 99.999 percent efficient, to reduce the concentrations to relatively safe conditions. Such efficiencies have been heretofore unknown in a relatively compact and low cost system.

Also, such a new and improved emergency scrubbing system should be able to confine within it, to a reasonable extent, both the deadly fluids under treatment flowing through it, as well as the dangerous treating fluids being delivered to the fluids under treatment. Moreover, such a new emergency scrubbing system should be able to be powered by a small lower cost electrical power subsystem. Preferably, such a system would include the advantages afforded by a system capable of performance on a once-through basis and would avoid the problem of ineffective and incomplete neutralization reactions within the system.

DISCLOSURE OF INVENTION

It is an object of the present invention to provide an emergency scrubbing system, and a method of using it, wherein unwanted noxious fluids can be treated quickly and highly efficiently, on an emergency basis.

It is a further object of the present invention to provide such an emergency scrubbing system and a method which can respond quickly to treat unwanted constituents, and which has a relatively compact, low height design.

It is a still further object of the present invention to provide such an emergency scrubbing system which is able to confine to a large degree the fluids under treatment, as well as dangerous treating substances, within the system, and which is relatively economical to operate.

Briefly, the above and further objects of the present invention are realized by providing a new and improved emergency scrubbing system for removing or rendering harmless in a rapid and effective manner, unwanted dangerous rapidly released fluids accidentally escaping explosively. An emergency scrubbing system guides rapidly escaping noxious fluids under pressure along an irregularly shaped non-linear delay path of travel, and admits a treating substance to the fluid to provide a preliminary treatment therefor to help neutralize the fluid. A fan, located near the outlet of the system, draws the noxious gas therethrough at relatively low pressure to help confine the dangerous fluids within the system. The preliminarily treated fluid is then treated at the exit end of the delay path for providing a final treatment before releasing it to the atmosphere. The final treatment is prepared as the fluid flows through the delay path for a predetermined period of time substantially equal to the length of time required for the fluid under pressure to flow through the delay path.

In one form of the invention, the noxious gas is drawn through a fluid conditioning stage containing wire mesh wetted by the treating substance. The mesh provides a surface for conditioning preliminarily the noxious gas and, in addition, aids in uniformly distributing the gas within the system. Such uniform distribution helps improve system efficiency by substantially increasing the likelihood of complete neutralization reactions within the system by helping to eliminate "hot spots."

An advantage of the present inventive system and method is the reducing of the level of escaping noxious fluids, such as chlorine to a relatively safe level such as about 15 ppm or less, without requiring the use of a tall packed bed tower or Venturi systems. A further advantage of such an inventive system and method is the removing or rendering inactive of unwanted noxious escaping fluids on a once through basis, thereby eliminating the problems encountered in a recycling system.

Because the noxious gas is drawn through the system, the deadly fluids under treatment are helped to be confined within the emergency scrubbing system. Thus, people in the vicinity of the equipment are protected from the explosively released fluids under treatment escaping accidentally from the emergency scrubbing system during its emergency operation.

A further advantage of the present inventive system is that the treating fluids, such as caustics, are delivered efficiently at relatively low pressure. As a result, the likelihood of a dangerous reagent leakage from the system is greatly reduced, if not prevented entirely, thus contributing to operating personnel safety. In addition, a less expensive emergency electrical power source is required.

Because of its compact size, the inventive system requires substantially less space than conventional scrubbing systems. Moreover, the inventive system is more economical to manufacture and to use.

In short, the present inventive emergency scrubbing system is the first known such system, which has proven to be about 99.999 percent effective to render harmless or to remove deadly concentrations of explosively released noxious fluids such as chlorine gas. In addition, the inventive system is relatively compact in its design, and has a substantially smaller height than prior known systems. Additionally, the inventive system helps confine within the system the noxious fluid under treatment, as well as the highly caustic treating fluids. Also, the new system is able to be powered by less expensive electrical generation subsystems.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein.

BEST MODE FOR CARRYING OUT THE INVENTION

Figure 1:
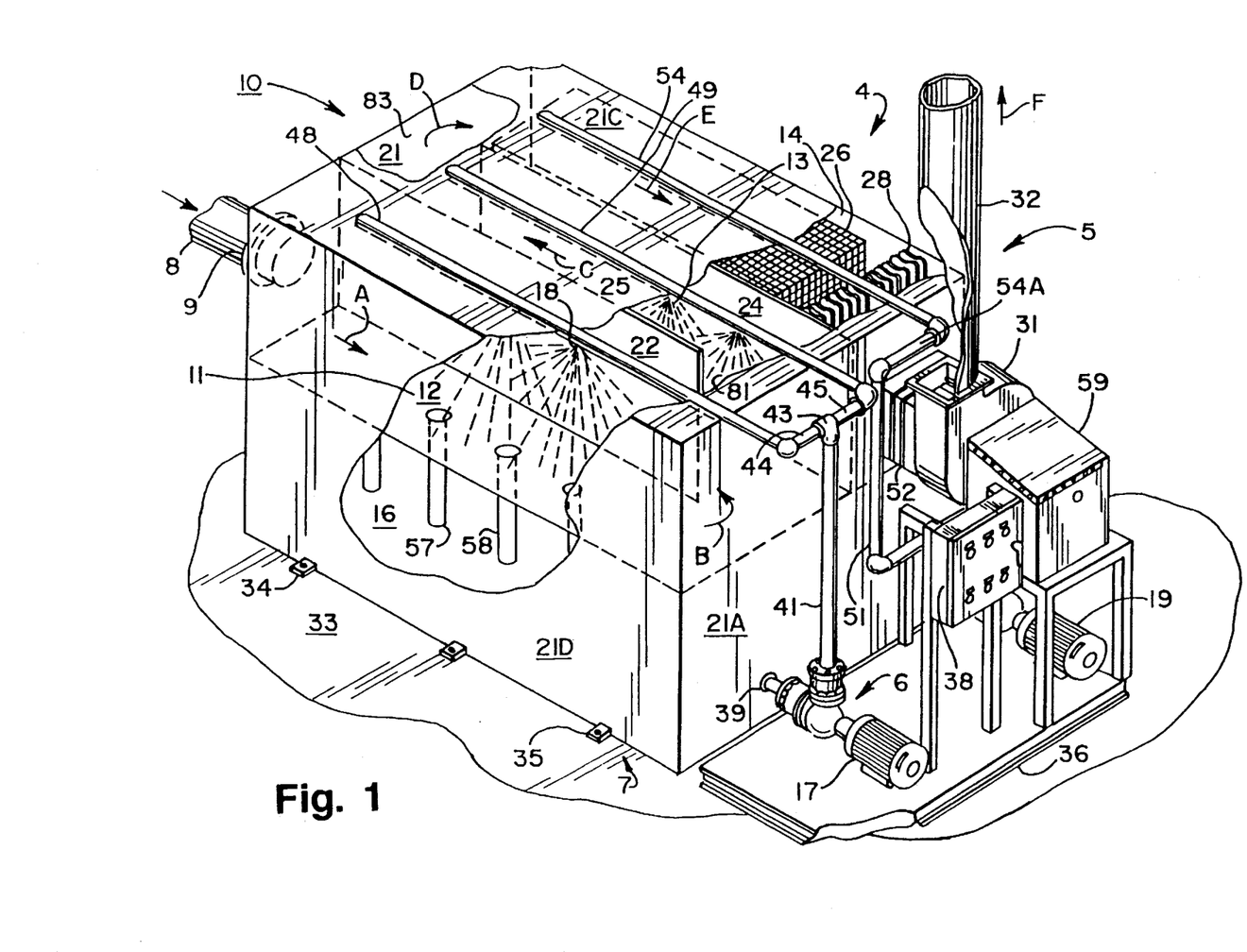
FIG. 1 is a partially diagrammatic pictorial view, with portions thereof broken away, of an emergency scrubbing system, which is constructed according to the present invention.
Figure 2:
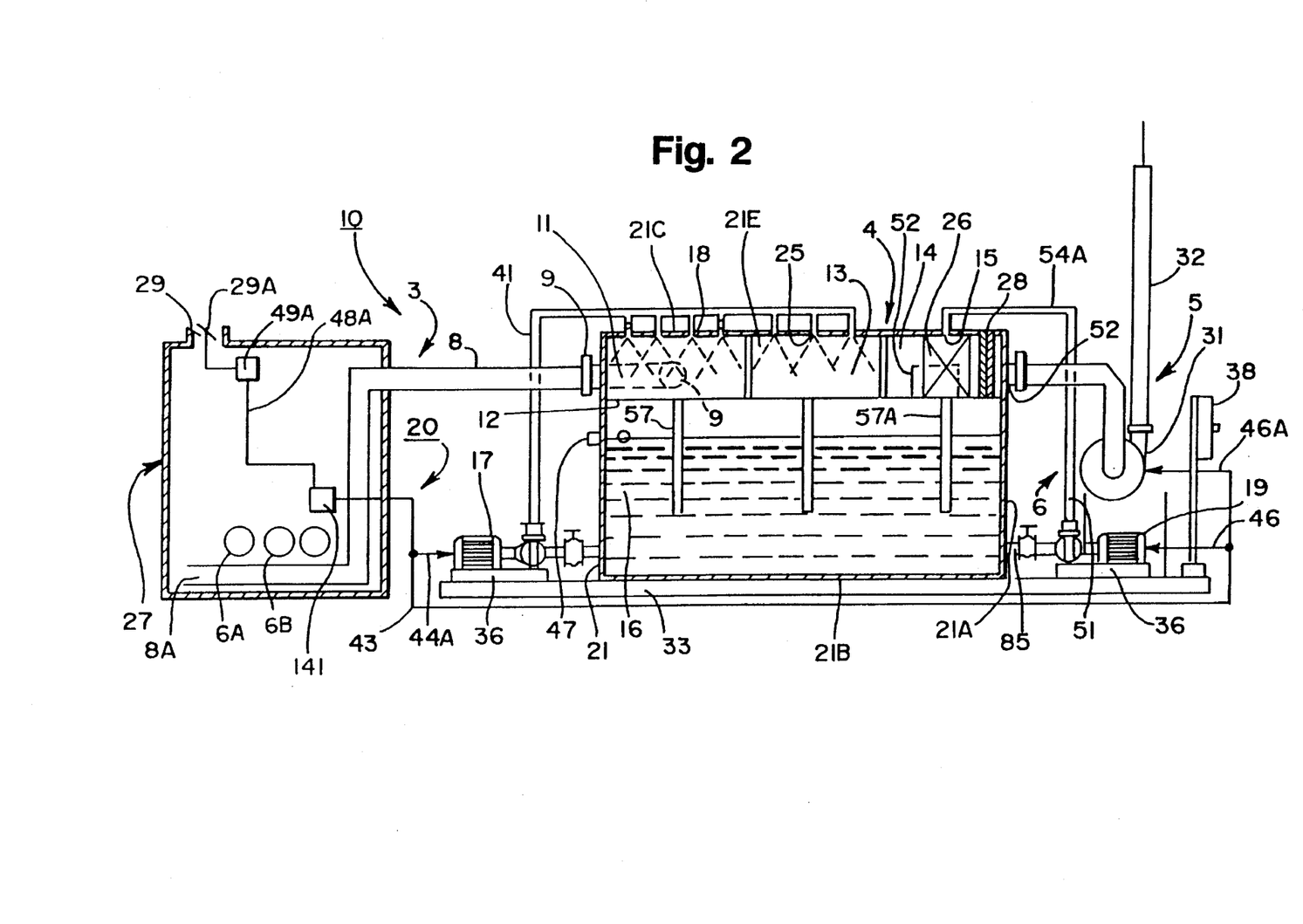
FIG. 2 is a diagrammatic elevational view of the system of FIG. 1, illustrating it together with a gas tank enclosure.

Referring now to the drawings, and more particularly to FIGS. 1 and 2 thereof, there is shown a new emergency scrubbing system 10, which is constructed in accordance with the present invention. The system 10 is comprised generally of a noxious gas delivery subsystem 3, a chamber construction 4, a reagent delivery apparatus 6, and an exhaust subsystem 5. The system 10 is supported and held in place by elements of a support and installation apparatus 7.

The system 10 is adapted to be constructed in fluid communication via a conduit 8 having an opening or inlet 8A within the interior of an enclosure 27 such as a room or cabinet having tanks, such as tanks 16A and 16B, containing a noxious fluid under pressure, such as liquid chlorine under pressure. Should an emergency occur where the chlorine gas escapes explosively from one or more of the tanks, a damper 29A (FIG. 2) for a vent 29 (FIG. 2) is closed abruptly to confine the gas within the interior of the enclosure. The system 10 then immediately withdraws the noxious fluid and neutralizes it to prevent, or at least greatly reduce, the possibility of endangering persons in the vicinity.

It should be understood that while chlorine gas under pressure is disclosed herein, other different types and kinds of noxious fluids, such as sulfur dioxide, can also be treated by the system of the present invention.

The delivery system 3 comprises an inlet 9 and the conduit 8. The inlet 9 receives the rapidly escaping noxious chlorine gas under pressure from within the interior of the enclosure 27 via the conduit 8, as the enclosure damper 29A closes. In operation, the noxious gas flows from the delivery system 3 into the chamber construction 4 for treatment therewithin.

The chamber construction 4 is generally boxlike in appearance, having a back wall 21 and a front wall 21A, a bottom wall 21B, top wall 21C and side walls 21D and 21E. The walls define an inlet chamber 11, an intermediate chamber 13 and an outlet chamber 14. The chambers are arranged side-by-side horizontally and are connected in series fluid communication to provide an irregularly shaped non-linear delay path of travel for guiding the chlorine gas to an outlet or stack for releasing the treated gas safely to the atmosphere. The gas flows through the three chambers in the back and forth directions as indicated generally by the arrows A through E, and finally emerges in a vertical path of travel through a stack 32 as indicated by the arrow F. The direction of the path of travel reverses twice (at the arrow B and at the arrow D).

As the noxious gas flows through the construction 4 of the system 10, the reagent delivery apparatus 6 is activated. The apparatus 6 is comprised generally of pumps for moving a caustic reagent by means of risers and manifolds into spray nozzles for delivery of a fine spray of reagent into the noxious gas undergoing treatment. After treatment, the gas flows through the exhaust subsystem 5, and thence into the atmosphere.

The exhaust subsystem 5 generally comprises an outlet conduit 52 and a fan 31 for drawing the noxious gas through the system 10 and for delivery of the treated gas to the stack 32 for exhaust therefrom into the atmosphere.

The spray nozzles, such as the nozzles 18 and 25, admit the treating substance, in the form of a caustic reagent, to the chlorine gas flowing through the inlet and intermediate chambers 11 and 13, to provide a preliminary or initial treatment for the gas, as it is guided along the delay path defined by the arrows A through D to help neutralize the chlorine gas. A set of spray nozzles such as the nozzle 15 (FIG. 2) at the exit end of the delay path of travel for the outlet chamber 14 prepares or activates a packed bed 26 disposed within the outlet chamber 14 by commencing to spray the bed with a treating substance such as a caustic reagent, when the chlorine first enters the inlet 9. In this manner, once the chlorine gas reaches the packed bed, the bed is properly activated and ready to provide a final treatment for the preliminarily treated chlorine. Thus, the fluid to be treated flows through the delay path A through D for a predetermined period of time substantially equal to the length of time required for the the packed bed 26 to become wetted with caustic reagent.

It will be noted that the noxious fluid, such as chlorine gas, is immediately treated preliminarily along the delay path, while the packed bed 26 becomes fully activated. Since the inlet, intermediate and outlet chambers are disposed side-by-side horizontally, the overall unit is very compact in size, and the bed 26 can be relatively small in size, as compared to a large vertical packed tower, requiring a long time to activate properly. As a result, the inventive system is relatively compact in size, and is highly efficient and effective in operation. Also, the system 10 can respond quickly to a sudden release of noxious fluids.

In operation, the rapidly and massively escaping fluids passing through the inlet conduit 8 via the inlet 9, enter the inlet chamber 11 where removal of the chlorine, by reaction with the caustic solution is commenced. The gas undergoing treatment follows the path of travel indicated by the arrows A through F passing from the inlet chamber 11 into the intermediate chamber 13, thence into the outlet chamber 14 and into the atmosphere through the stack 32. A fan 31, driven by a conventional motor (not shown) in a housing 59, draws the gas through the system 10.

Considering now the chamber construction 4 in greater detail, the inlet chamber 11, the intermediate chamber 13 and the outlet chamber 14 are rectangular and boxlike in configuration, having a common back wall 21 and a common front wall 21A. A common wall 22 extending from the back wall 21 separates the inlet chamber 11 from the intermediate chamber 13. The wall 22 does not extend along the full length of the inlet chamber 11 and the intermediate chamber 13 and is spaced from the front wall 21A by a space 81 (FIG. 1) to provide an opening between the chambers 11 and 13, so that the gas stream passes conveniently from the inlet chamber 11 into the intermediate chamber 13 and, in the process, the direction of flow from forwardly to rearwardly, as indicated by the arrow B, is reversed.

A common wall 24 divides the intermediate chamber 13 and the outlet chamber 14. The wall 24 extends from the front wall 21A parallel to the wall 22 and is spaced from the rear wall by a space 83 to provide an opening between the chambers 13 and 14 for gas flow as indicated at D. Thus, the gas stream flows conveniently from the intermediate chamber 13 into the outlet chamber 14 at the arrow D.

It will be noted that, for delay purposes, the direction of the flow of the gas stream from rearwardly to forwardly is reversed as the gas passes from the intermediate chamber 13 into the outlet chamber 14. The inlet chamber 11, intermediate chamber 13 and the outlet chamber 14 share a common internal horizontal wall 12 with a caustic tank or reservoir 16. The system 10 may be fixed to a surface, such as a floor 33, by means of conventional fixing devices as, for example, those comprising the installation apparatus 7. The apparatus 7 utilizes conventional means, such as bolts, (not shown) to fix mounting brackets such as the brackets, 34 and 35 to the floor 33. The apparatus 7 also comprises a pad 36 for providing support to some of the elements of the delivery apparatus 6.

The emergency scrubbing system 10 is particularly useful for neutralizing chlorine gas chemically when the chlorine is released under explosive conditions. The gas under pressure follows a horizontal path of travel, reversing twice before passing through an outlet conduit 52 from the outlet chamber 14 into the inlet of the fan 31, which discharges the treated gas into the bottom of the stack 32.

As best seen in FIG. 2, chlorine removal occurs when a pump 17 draws the caustic reagent, such as sodium hydroxide, or the like, from a reservoir 16 below the common bottom wall 12, via an outlet 39 for delivery upwardly through a riser conduit 41 to a tee 43 through conduits 44 and 45, into a pair of manifolds 48 and 49 extending longitudinally along the top of the respective inlet and intermediate chambers 11 and 13. Manifolds 48 and 49 contain a plurality of downwardly directed spray nozzles, such as the nozzles 18 and 25, for directing a spray pattern containing droplets of caustic solution. The droplets are about 300 microns in diameter, thus presenting a large surface area for chemical reaction of the caustic solution with the chlorine in the gas stream. It should be understood that the pumps and other components of the piping and electrical connection are shown in somewhat different locations diagrammatically in FIG. 2 for illustration purposes.

Drains 57 and 58 in the bottom wall 12 admit liquids and reaction products from the inlet chamber into the reservoir 16 below by draining thereto under the force of gravity. The liquid surface may be employed in place of the common bottom wall 12 thus eliminating the need for the drain pipes. Similar drains such as the drain 57A (FIG. 2), perform similar functions in the intermediate and outlet chambers 13 and 14.

Considering now the reagent delivery apparatus 6 in greater detail, at the time the system 10 is activated, a pump 19 delivers the caustic reagent from the reservoir 16 through an outlet 85 (FIG. 2), upwardly through a riser conduit 51 and a connector conduit 54A, and thence through a manifold 54 which is disposed along the top of the outlet chamber 14. A plurality of spray nozzles, such as the nozzle 15 (FIG. 2) is disposed along the manifold 54 for treatment of the packed bed, in a manner similar to the treatment occurring in the inlet chamber 11 and the intermediate chamber 13. The packed bed 26, containing conventional packing material, is located in, and extends along, the interior of the outlet chamber 14, and is wetted by the caustic reagent being delivered by the spray nozzles in the manifold 54.

The packed bed 26 does not become fully functional until the packing material has been wetted sufficiently by the treating solution. In this regard, the pump 19 is turned on simultaneously with the pump 17, so that wetting of the packed bed begins immediately. At the same time, the gas stream, following the doubly reversing delay path is delayed in its passage for a sufficiently long period of time for the packed bed 26 to become fully wetted. Thus, chlorine removal from the gas stream begins immediately upon entry of the stream into the inlet chamber 11, continues as the gas passes through the immediate chamber 13 and the outlet chamber 14 so that, after the gas has passed through the fully wetted packed bed 26, the concentration of chlorine in the gas has been reduced to a safe level, such as about 15 ppm, or less.

The treated gas, after passing through the packed bed 26, is drawn into the exhaust subsystem 5, through a mist eliminator 28 from whence it flows through the conduit 52 by the fan, which discharges the finally treated gas into the atmosphere via the stack 32.

The emergency scrubber system 10 is activated automatically when sensors detect a dangerous release of chlorine. However, the system may also be activated manually through a conventional control panel 38 which, together with the pumps 17 and 19, are supported on the pad 36 (FIG. 1). For illustration purposes, the pad 36 is shown diagrammatically in two parts for the sake of simplicity (FIG. 2).

As shown in FIG. 2, the storage enclosure 27 contains a plurality of one ton liquid chlorine containers, such as the containers 16A and 16B. A chlorine level sensing system generally indicated at 20, including a sensor 141 in the storage room 27, to monitor chlorine levels. In the event of a catastrophic leak, the sensor 141 sends an electrical signal via a lead 48A to a damper control 49A to close off the vent 29. Simultaneously therewith, an electrical signal is conveyed from the sensor 141 via conductors 44A, 46 and 46A for activation of the pumps 17 and 19, and the fan 31 respectively.

Figure 3:
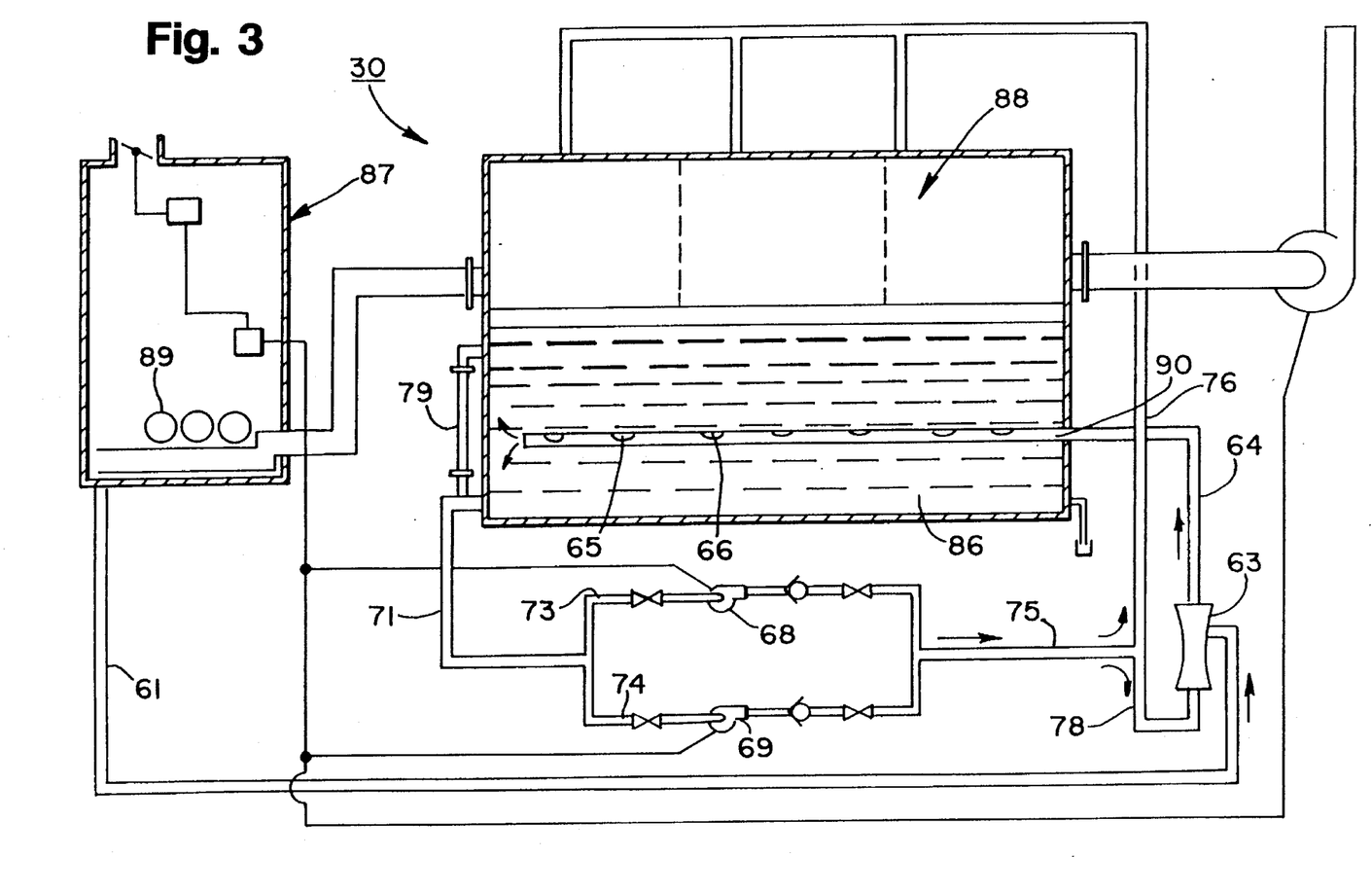
FIG. 3 is a diagrammatic elevational view of another emergency scrubbing system, which is also constructed according to the present invention.

Referring now to FIG. 3, there is disclosed an emergency scrubbing system 30, which is also constructed according to the present invention. The system 30 is generally similar to the system 10, except that the system 30 also treats any accumulation of unwanted noxious liquids within the interior of its associated tank enclosure 87, which is similar to the enclosure 27. The system 30 treats the rapidly escaping chlorine gas in the same manner as the system 10. The system 30 includes a liquid chlorine drain line 61 which receives liquid chlorine released in the enclosure 87 via tanks, such as a tank 89, under explosive conditions and conveys the liquid chlorine to an eductor 63. The eductor 63, in turn, draws the liquid chlorine therein, under pressure, as a result of the treating liquid being pumped therethrough from the reservoir 86. A plurality of openings, such as the openings 65 and 66 in a submerged conduit 90 within the reservoir 86, the conduit 90 being connected in fluid communication with the line to permit the liquid chlorine to be supplied to the reservoir 86 for reaction therewithin with a reagent solution, such as the one stored in the reservoir 16 of FIG. 2. A pair of pumps 68 and 69, receives caustic solution from the reservoir 86 via a line 71 into lines 73 and 74 respectively, and thence discharges into a line 75. The caustic solution is then pumped through a line 76 for distribution in the inlet, intermediate and outlet chambers indicated at 88, which are similar to the ones for the scrubber system 10 of FIGS. 1 and 2, for neutralizing the chlorine gas drawn therein. In addition, the caustic solution is pumped through the line 78 into the eductor 63 wherein the caustic liquid reacts with the liquid chlorine entering the eductor 63 and is drawn therein to be admitted into the interior of the reservoir 86. A sight glass 79 may be provided in order to display the level of the caustic within the reservoir 86. One of the two pumps 68 or 69, may be utilized as a standby, for the other pump.

Figure 4:
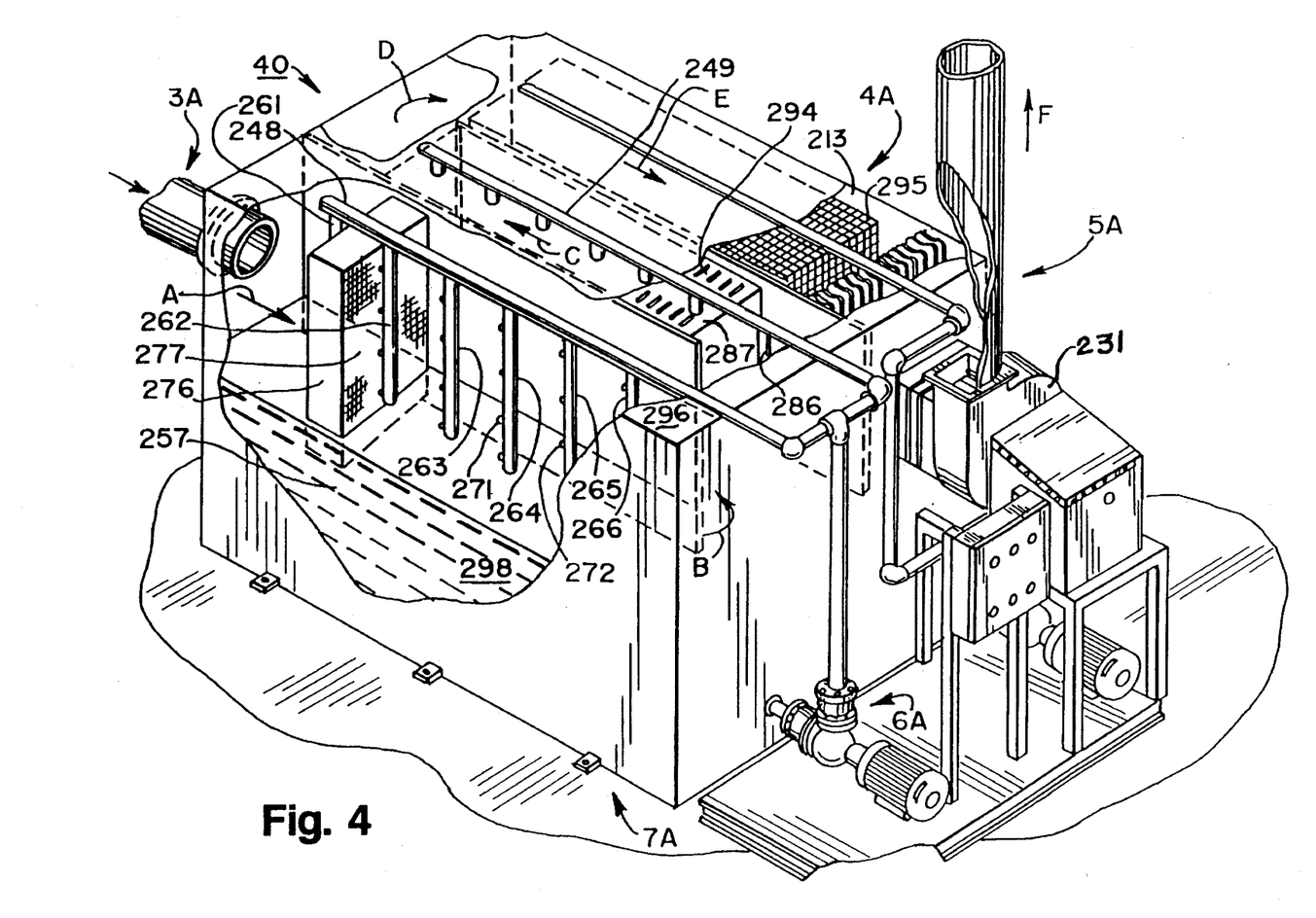
FIG. 4 is a partially diagrammatic pictorial view, with portions thereof broken away, of another form of an emergency scrubbing system which is constructed according to the present invention.
Figure 5:
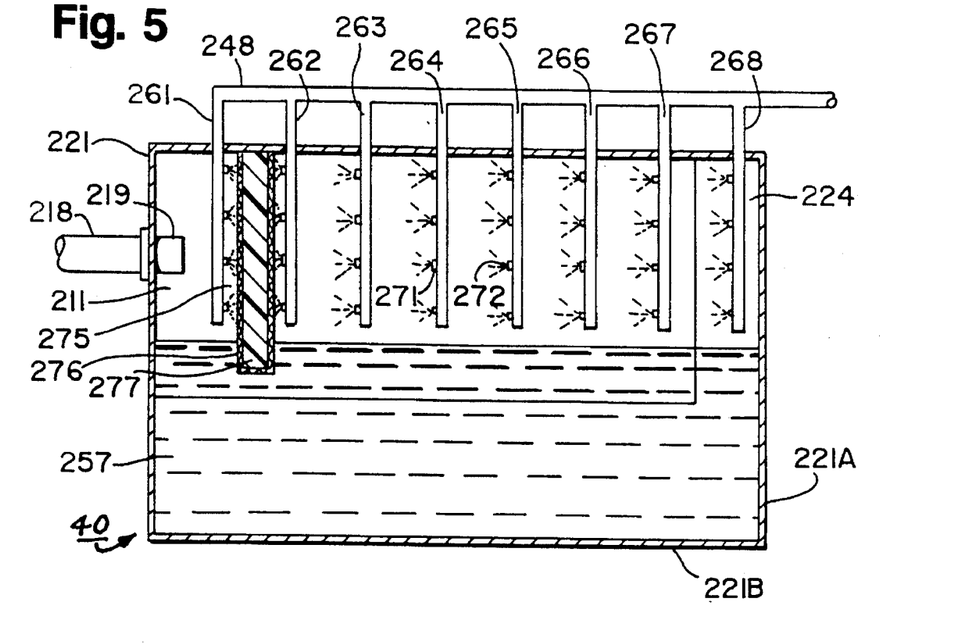
FIG. 5 is a diagrammatic sectional side view of the inlet chamber of the emergency scrubber of FIG. 4.
Figure 6:
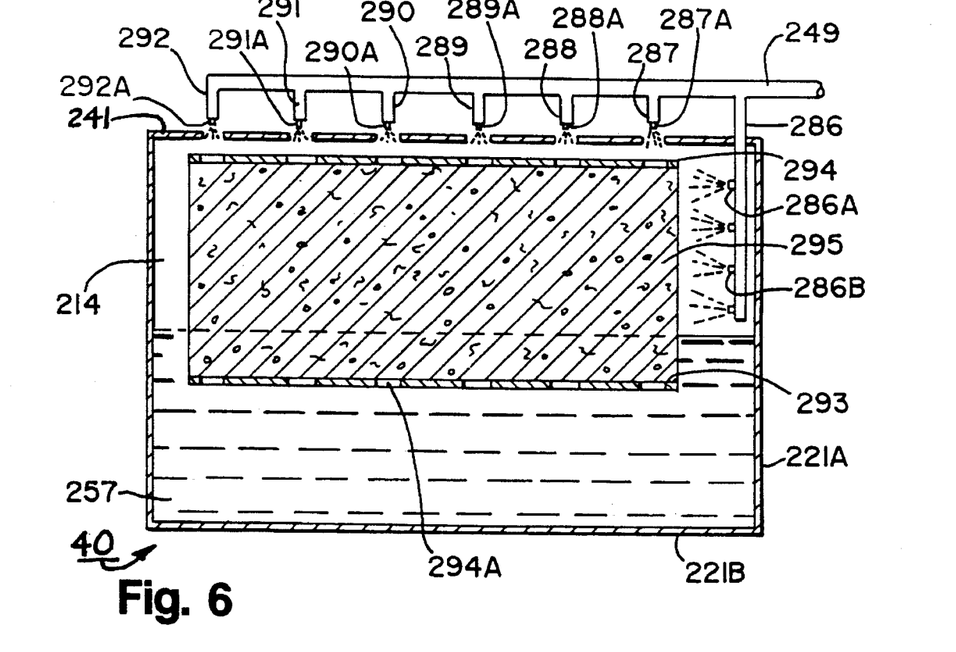
FIG. 6 is a diagrammatic sectional side view of the intermediate chamber of the emergency scrubber of FIG. 4.

Referring now to FIGS. 4, 5 and 6, there is disclosed an emergency scrubbing system 40, which is also constructed according to the present invention. The system 40 is generally similar to the system 10 except for the input and intermediate treatment chambers, and the caustic reservoir. In this regard, the system 40 is adapted to be used with an enclosure such as the enclosure 27 of FIG. 2, employing the sensors illustrated therein. The system 40 includes a gas delivery subsystem 3A connected in fluid communication with the enclosure to be protected, an exhaust subsystem 5A and a support and installation apparatus 7A which are identical, respectively, in structure and function to the gas delivery subsystem 3, exhaust subsystem 5 and apparatus 7 of the system 10. In addition, the flow of gas through the system 40 follows the path shown by the arrows A–F, in a manner generally similar to the gas flow through the system 10.

As shown in FIGS. 4–6, the system 40 generally comprises a gas delivery subsystem 3A having an inlet 219 for receiving rapidly escaping noxious chlorine gas under pressure from a conduit 218. The noxious gas is delivered from the inlet 219 into a chamber construction 4A. The chamber construction 4A is generally comprised of an inlet chamber 211 (FIG. 5), an intermediate chamber 214 (FIG. 6) and an outlet chamber 213 (FIG. 4). Unlike the construction 4 of the system 10, the construction 4A does not have a common internal horizontal wall, such as the wall 12 of FIG. 1, defining a reservoir. Instead, caustic reagent 257 is stored conveniently in a sump 298 (FIG. 4) of the construction 4A.

During system operation, the released gas, such as chlorine gas, generally follows the flow path shown by the arrow A to enter the inlet chamber 211 of the construction 4A. Flow of the gas through the system is aided by a fan 231 (FIG. 4), similar to the fan 31 of FIG. 1 which draws the gas through the chamber construction 4A, and, in the process, creates a negative pressure in the chambers of the construction 4A. In this manner, effective gas flow through the system is achieved, without the need for pressurizing the chambers in a positive manner, and thus causing a potentially dangerous condition should a leak inadvertently occur when extremely dangerous and life threatening concentrations of deadly explosive gas is flowing through the system. In this regard, in accordance with the present invention, the negative pressure condition tends to confine the deadly gas within the system, as opposed to a positive pressure system which tends to drive the deadly gas out of the system, should a leak or malfunction occur.

At the entrance of the inlet chamber 211, forming a conditioning stage, there is disposed, depending from a top wall 296 of the construction 4A and extending into the inlet chamber 211, a wire mesh pad or screen 277 which is held in place by a porous frame 276. The pad 277 is disposed generally at right angles to the flow path A and has a suitable porosity so as not to present undue back pressure to the flow of the gas therethrough. The screen is composed of polypropylene wire.

Upon activation of the system 40, the caustic reagent 257 is drawn from a lower portion of the construction 4A, through the reactant delivery apparatus 6A from whence it is pumped under pressure through manifolds 248 and 249. Downwardly depending pipes, such as the pipes 261–268, connected in fluid communication with the manifold 248 carry the caustic reagent to spray nozzles such as the nozzles 271 and 272, located on the pipes. Each of the pipes 263 through 266 has a plurality of the spray nozzles for directing counter currently a spray of caustic reagent against the flow path of the noxious gas. Spray nozzles similar to the nozzle 271 are located on the pipe 261 and are oriented in the direction of flow of the noxious gas to spray against and thus to wet the front surface of the pad 277. In a similar manner, spray nozzles located on the pipe 262 direct spray counter currently to the flow of the gas of the noxious flow path and thus to wet the back side of the pad 277.

As a result of the wetting of the pad 277 by the caustic reagent 257, preconditioning and neutralization of the noxious gas begins almost immediately upon delivery of the gas into the inlet chamber 211. In addition, the wetted pad 277 aids in dispersing the gas evenly throughout the chamber 211, thereby avoiding the concentration, sometimes experienced in conventional scrubbing systems, of noxious gasses at the core of the chamber. In this manner, the screen evenly distributes the incoming noxious gas and provides a surface for the neutralization reaction to occur. This gas conditioning stage provides for uniform distribution over the inlet chamber and permits preconditioning of the gas before it is flowed into the intermediate chamber 213. These operations are accomplished in a system 40 which is low in height and compact in design, as compared to conventional scrubbing systems. The utilization of the wetted pad 277 adds significantly to scrubbing efficiency by helping to absorb chlorine and acting as an initial scrubbing stage, thereby increasing overall system efficiency.

After the preconditioned gas has passed through the pad 277, it is sprayed continuously by an array of nozzles, such as the nozzles 271 and 272, as the gas flows through the inlet chamber and, following the course indicated by the arrow B, into the intermediate chamber 214. As the gas flows from the inlet chamber 211, it is wetted in the intermediate chamber 214 by nozzles, such as the nozzles 286A and 286B on a depending pipe 286, in fluid communication with the manifold 249.

In the intermediate chamber 214 upstream of the pipe 286, the gas passes through a packed bed 295. The bed is similar in construction and function to the packed bed 26 of the system 10. The bed 295 is held in place in the chamber 214 by a pair of upper and lower spaced apart horizontal perforated grates 294 and 294A for supporting the bed 295 therebetween. It should be understood that similar conventional grates are employed in connection with the packed beds shown in the outlet chambers of the system 40, as well as the system 10, even though the supporting grates having been omitted from the drawings for illustration purposes.

In operation, caustic fluid 257 is pumped through the manifold 249. Depending from the manifold 249, in fluid communication therewith, are downwardly depending stub pipes 287–292. Each pipe has at its discharge end a nozzle, such as the nozzles 287A–292A, for applying the treating substance to the gas as it flows through the chamber 214. As shown in FIG. 6, a top perforated wall 241 has its opening aligned with the nozzles 287A–292A to permit the treating fluid to flow therealong and into the packed bed 295 via the perforated top grate 294. The spray nozzles of the system 40 deliver the caustic reagent in droplets of about 300 microns, in a manner similar to the spray nozzles of the system 10.

After treatment in the intermediate chamber 214, the gas is drawn into the outlet chamber 213, in which it is further treated in a manner similar to that in the system 10. From the outlet chamber, the fully treated gas is then exhausted into the atmosphere through the exhaust subsystem 5A. As discussed below, the chlorine level in the gas exiting the system 40 is almost 0 ppm.

An actual working model of the emergency scrubbing system 40 of the present invention was tested at the Southwest Research Institute, San Antonio, Tex., an independent certified testing laboratory. The purpose of the test was to evaluate the performance of the system 40 for simulated chlorine spills. The test results showed 99.999% in system efficiency of removing chlorine under simulated emergency conditions.

The test equipment included a chlorine cylinder (not shown) mounted on a load cell (not shown), a flash room enclosure (not shown), the emergency scrubber system 40 of the present invention, and temperature, pressure and flow measurement instruments (not shown). The flash room dimensions were approximately 12 feet by 11 feet by 12 feet.

The test instrumentation was as follows:
a. Flash Room Enclosure Static Pressure:
The flash room enclosure static pressure was monitored with a pressure transducer with an accuracy of ±0.01" W.C.
b. Chlorine Concentration:

The chlorine concentration at the outlet of the scrubber system 40 was monitored with an Enterra Model 4000 chlorine analyzer. The analyzer was calibrated and certified by its manufacturer and was field checked frequently against a calibration kit provided by Enterra.

c. Chlorine Release Rate:

The chlorine release rate was calculated from the measured chlorine cylinder weight lost versus time. The weight of the chlorine cylinder (not shown) was monitored continuously with a calibrated load cell.

d. Temperature:

Temperatures of the ambient air, flash room enclosure, scrubber inlet, scrubber outlet, and scrubber sump or reservoir were measured with type "K" thermocouples.

e. Scrubber Pressure Drop:

The scrubber pressure drop was determined with a Magnehelic differential pressure gauge.

f. Scrubber Air Flow Rate:

Volumetric air flow rates were measured with an orifice plate (not shown) at the inlet of the scrubber system 40. The orifice plates were calibrated against a standard pitot tube in accordance to EPA Method 2.

Except for the differential pressure across the orifice plate and the scrubber pressure drop, all process data, i.e., temperatures, flash room static pressures, load cell, and chlorine concentrations, were acquired with a main-frame data acquisition system at 5 second intervals. Orifice and scrubber pressure drops were recorded manually several times during each test. The entire test was also monitored and recorded with a video camera (not shown).

System functional checks were performed to insure that all instruments, the emergency scrubber, and the data acquisition system were functioning properly. Room air or nitrogen was used to check equipment operation, negative pressure in the flash room and leaks in the system.

Figure 7:
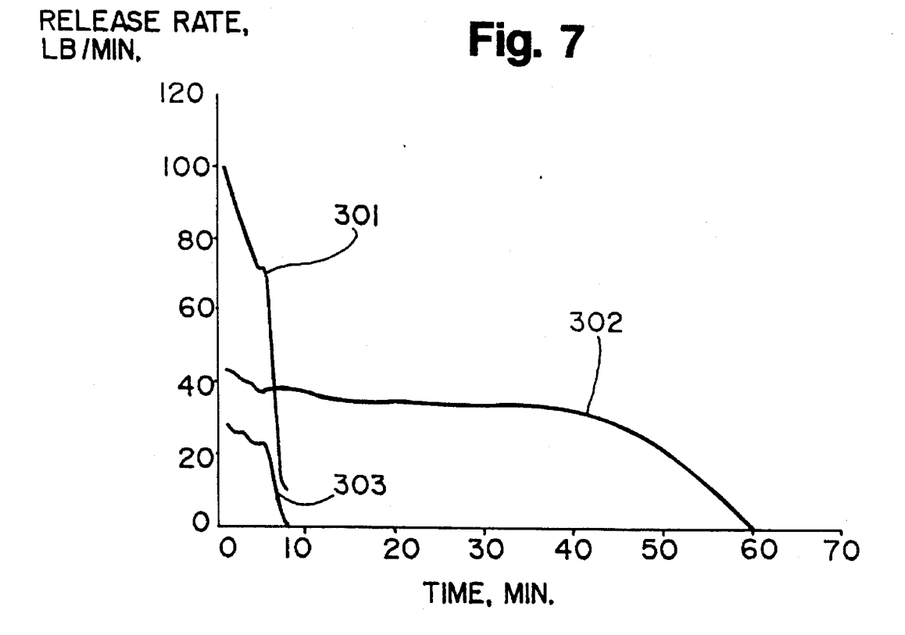
FIG. 7 graphically depicts chlorine release rates as a function of time during a test of the emergency scrubber of FIG. 4.

The test of the emergency scrubber system 40 was conducted with chlorine released from a standard one ton cylinder (not shown) into the flash room enclosure at the prescribed leak rate and exhausting the room air through the emergency scrubber system. FIG. 7 depicts chlorine release rates as a function of time. Curves 301 and 303 depict release from 550 pound and 150 pound chlorine containers, respectively. The curve 302 depicts the chlorine release rate as a function of time for the one ton cylinder utilized in the test.

Figure 8:
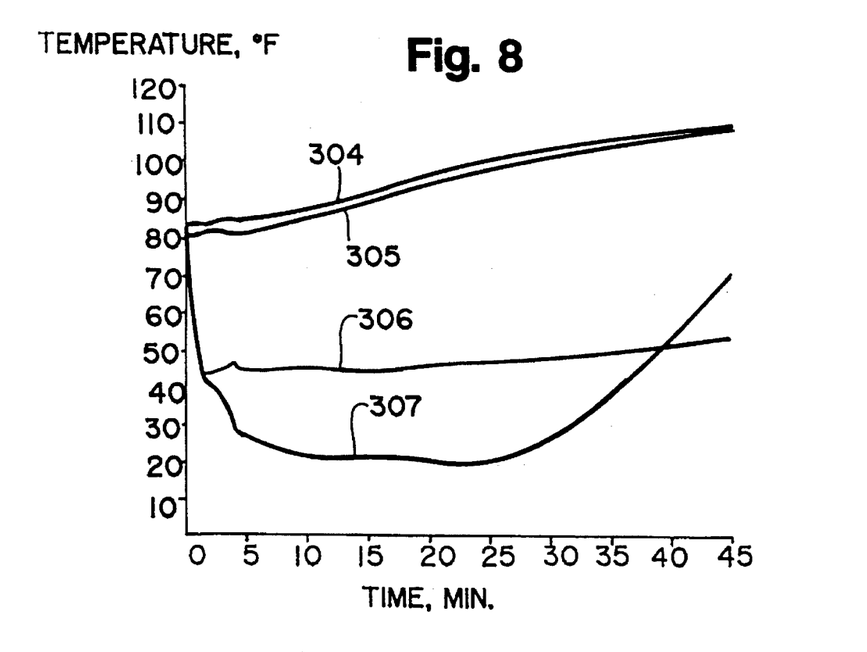
FIG. 8 graphically depicts temperature profiles during a test of the emergency scrubber of FIG. 4.

Referring now to FIG. 8, there is depicted the temperature profiles during the test for the flash room enclosure, curve 307, emergency scrubber inlet, curve 306, emergency scrubber outlet, curve 308, and the scrubber sump or reservoir, curve 305. It will be noted that the temperature in the flash room enclosure dropped instantly once the chlorine was released into the room enclosure. The temperature dropped to below the freezing point in about four minutes. Flash room temperature increased back to ambient temperature after the chlorine cylinder was emptied. The scrubber inlet generally followed that of the flash room enclosure. The results depicted in FIG. 7 indicate that nearly all chlorine vapor was ventilated when it was flashed and vaporized. As expected, due to the heat of reaction, the scrubber sump temperature gradually increased. However, since the emergency scrubber system 40 is excellent for heat and mass transfer, the air reached equilibrium with the sump at the scrubber outlet.

Figure 9:
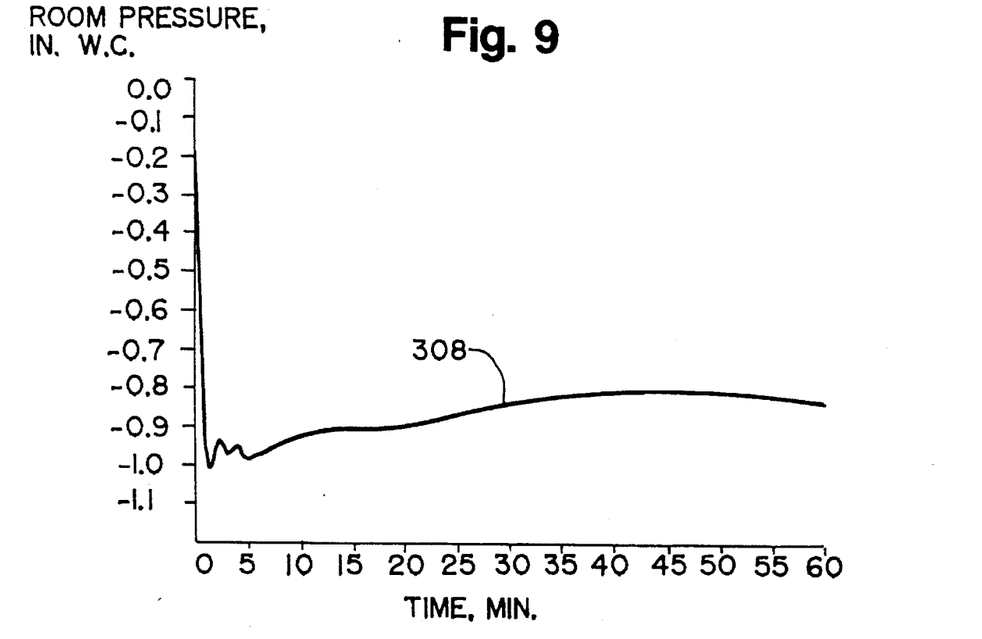
FIG. 9 graphically depicts flash room static pressure during a test of the emergency scrubber of FIG. 4.
Figure 10:
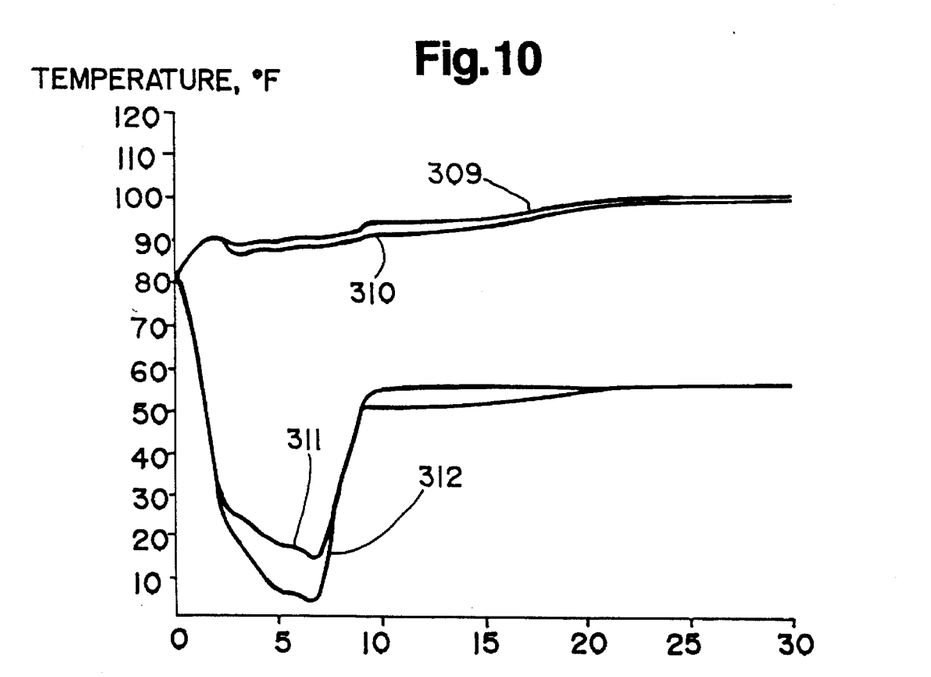
FIG. 10 graphically depicts temperature profiles during a test of the emergency scrubber of FIG. 4.

Referring now to FIG. 9, there is graphically depicted the static pressure of the flash room enclosure versus time. Throughout the test, the flash room enclosure was maintained under a negative pressure. During the test, the release of chlorine from the one ton cylinder (not shown) occurred at the rate of 52 pounds per minute (room volume=1600 cubic feet). Table 1 shows a summary of the test results.

Figure 11:
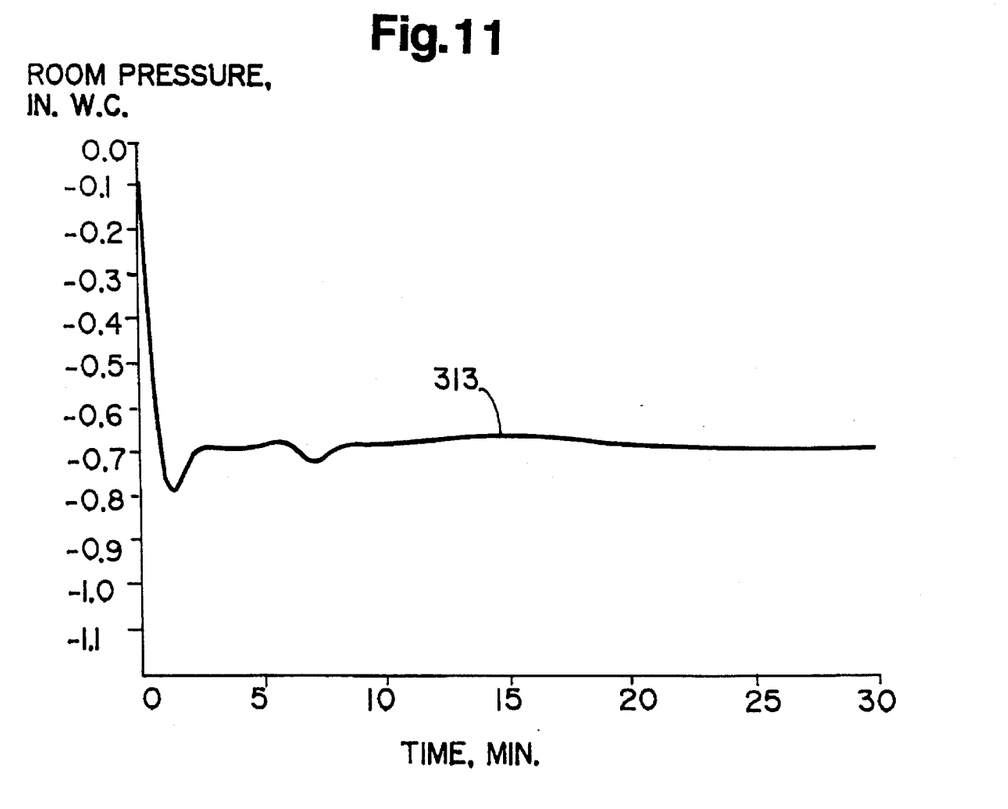
FIG. 11 graphically depicts flash room static pressure during another test of the emergency scrubber of FIG. 4.

A second test was conducted on the emergency scrubber system 40. In this test, approximately 550 pounds of chlorine from a one ton cylinder (not shown) were introduced into a 250 gallon holding tank (not shown). Table 2 shows a summary of the test results. In this test, the chlorine release rate followed the curve 301 of FIG. 7. The temperature profiles during the test are depicted in FIG. 5 and are identical to those experienced in the first test. The flash room static pressure is depicted at curve 313 of FIG. 11.

TABLE 1

TEST RESULTS - RELEASE FROM 1 TON CYLINDER
Scrubber Air Flow Rate: 1,180 cfm

| Time, min. | Release Rate lb/min | (T-3) Flash Room Temp. | (T-8) Scrubber Inlet Temp. | (T-9) Scrubber Outlet Temp. | (T-10) Scrubber Sump Temp. | Room Pressure, in. WC |
|---|---|---|---|---|---|---|
| 1 | 52 | 48 | 47 | 84 | 81 | −0.94 |
| 2 | 42 | 41 | 44 | 84 | 82 | −0.95 |
| 3 | 40 | 37 | 45 | 85 | 82 | −0.97 |
| 4 | 39 | 30 | 47 | 85 | 82 | −0.95 |
| 5 | 37 | 27 | 45 | 85 | 82 | −0.98 |
| 10 | 37 | 22 | 46 | 88 | 86 | −0.92 |
| 15 | 35 | 22 | 45 | 92 | 90 | −0.90 |
| 20 | 35 | 21 | 47 | 97 | 95 | −0.89 |
| 30 | 34 | 27 | 49 | 104 | 102 | −0.83 |
| 45 | 29 | 72 | 55 | 111 | 110 | −0.80 |
| 60 | — | 72 | 63 | 114 | 113 | −0.83 |
| 120 | — | 69 | 61 | 109 | 108 | |
| 180 | — | 71 | 65 | 106 | 105 | |
| 240 | — | 67 | 62 | 106 | 104 | |
| 300 | — | 71 | 70 | 105 | 103 | |
| 360 | — | 74 | 74 | 101 | 98 | |

TABLE 2

TEST RESULTS
Scrubber Air Flow Rate: 1,180 cfm
Release from Pressurized Chlorine Holding Tank (550-lb Release)

| Time, min. | Release Rate lb/min. | (T-3) Flash Room Temp. | (T-8) Scrubber Inlet Temp. | (T-9) Scrubber Outlet Temp. | (T-10) Scrubber Sump Temp. | Room Pressure, in. WC |
|---|---|---|---|---|---|---|
| 1 | 99 | 31 | 33 | 91 | 91 | −0.73 |
| 2 | 91 | 19 | 25 | 89 | 87 | −0.72 |
| 3 | 84 | 12 | 21 | 90 | 88 | −0.69 |
| 4 | 77 | 7 | 18 | 90 | 88 | −0.69 |
| 5 | 71 | 6 | 17 | 91 | 89 | −0.68 |
| 6 | 65 | 7 | 16 | 91 | 89 | −0.68 |
| 7 | 22 | 31 | 33 | 92 | 90 | −0.72 |
| 8 | 10 | 49 | 49 | 93 | 91 | −0.69 |
| 9 | — | 56 | 52 | 95 | 92 | −0.68 |
| 10 | — | 57 | 53 | 96 | 94 | −0.68 |
| 15 | — | 57 | 56 | 100 | 99 | −0.66 |
| 20 | — | 58 | 58 | 102 | 101 | −0.68 |
| 30 | — | 60 | 59 | 102 | 101 | −0.69 |
| 45 | — | 71 | 78 | 102 | 100 | |
| 60 | — | 78 | 82 | 102 | 101 | |
| 75 | — | 84 | 93 | 102 | 101 | |
| 90 | — | 90 | 99 | 103 | 101 | |

During the test, the chlorine concentration at the scrubber outlet ranged from 0.1 to 0.6 ppm which is well below the 15 ppm limit set by the Uniform Fire Code.

It should be noted that the mesh pad 277 and the packed beds are partially submerged within the caustic reservoir. Thus, the overall height of the system 40 is reduced as compared to the system 10 having a floor or common horizontal wall separating the reservoir from the chambers.

While particular embodiments of the present invention have been disclosed, it is to be understood that various different modifications are possible and are contemplated within the true spirit and scope of the appended claims. There is no intention, therefore, of limitation to the exact abstract or disclosure herein presented.

What is claimed is:

1. An emergency scrubbing system for the treatment of noxious fluids stored under pressure in containers housed within a storage room, the fluids, when released, giving off a noxious gas, said emergency scrubbing system comprising:

(a) a substantially rectangularly shaped sealed chamber, said chamber having an inlet and an outlet, said sealed chamber including an elongated first chamber for confining a fluid for treatment therein and an elongated second chamber, in fluid communication with said first chamber for receiving the fluid from said first chamber and for confining the fluid for further treatment therewithin, said first chamber and said second chamber being disposed in side by side relationship, said sealed chamber containing a treating substance for the treatment of noxious gas;

(b) means, coupled between said storage room and said inlet of said sealed chamber, for transferring noxious gas from said storage room to said chamber when noxious fluids are released under pressure within said storage room;

(c) delay means disposed within said sealed chamber between said inlet and said outlet, said delay means receiving noxious gas released under pressure and having a plurality of delay stages in fluid communication to provide a delay path to delay the noxious gas from reaching said outlet for a prescribed period of time following the noxious gas entering said inlet, said delay means including a discontinuous wall, said wall being disposed axially between said first chamber and said second chamber;

(d) scrubbing apparatus, disposed adjacent the outlet of said sealed chamber, the providing a final treatment of the noxious gas prior to releasing the finally treated gas to atmosphere;

(e) exhaust means, including a motor driven fan, coupled to said outlet for exhausting the finally treated gas to atmosphere;

(f) means, including motor driven pumping means, for delivering said treating solution into said delay stages and into said scrubbing apparatus, said treating solution providing a preliminary treatment of the noxious gas in those delay stages which are upstream of said scrubbing apparatus while bringing said scrubbing apparatus to full activation; and (g) sensor means for sensing when there is a condition indicative of a release of either of said noxious fluids and noxious gas within said storage room and providing an electrical signal activating the motor driven fan of said exhaust means and the motor driven pumping means of said means for delivering in response to such a release condition, the noxious gas, under pressure, flowing from said storage room through said delay means and being preliminarily treated and delayed in said upstream stages while said scrubbing apparatus is being fully activated in preparation for final treatment of the preliminarily treated gas and exhausting the finally treated gas to atmosphere through said exhaust means.

2. An emergency scrubbing system according to claim 1, wherein said substantially rectangular sealed chamber includes:

duct means for conducting the fluid into said first chamber;

diffusing means disposed downstream of the duct means for distributing evenly the fluid in said first chamber;

first spray nozzle means disposed within said first chamber for spraying the fluid with a treating substance;

second spray nozzle means disposed within said second chamber for spraying treated fluid received from said first chamber with said treating substance;

an elongated third chamber in fluid communication with said second chamber for receiving the fluid therefrom;

a packed bed disposed within said third chamber for further treatment of the fluid therein;

means for directing the treated fluid through the packed bed;

a treating substance reservoir in fluid communication with said first and second spray nozzle means and said packed bed;

means for pumping said treating substance from said treating substance reservoir through said first and second spray nozzle means and said packed bed; and stack means for conducting the treated fluid from the packed bed for discharging the treated fluid into the atmosphere.

3. An emergency scrubbing system according to claim 2, including a common wall for separating said first chamber, said second chamber and said third chamber from the treating substance reservoir.

4. An emergency scrubbing system according to claim 2, wherein said diffusing means is a mesh pad.

5. An emergency scrubbing system according to claim 4, wherein said mesh pad includes polypropylene wire.

6. An emergency scrubbing system according to claim 2, further including means for supporting said diffusing means and said packed bed partially submerged in the treating substance within said reservoir.

7. An emergency scrubbing system according to claim 2, including a packed bed disposed within said second chamber.

8. An emergency scrubbing system according to claim 1, wherein said sensor means measures fluid concentration in the fluid upstream of said inlet.

9. An emergency scrubbing system according to claim 8, including means responsive to said sensor means for pumping said treating substance to first spray nozzle means, second spray nozzle means and the packed bed.

10. An emergency scrubbing system according to claim 1, wherein said treating substance is NaOH in aqueous solution.

11. An emergency scrubbing system according to claim 11, including a mist eliminator disposed in said sealed chamber downstream of the packed bed.

12. An emergency scrubbing system according to claim 1, wherein said delay means are disposed in side by side relationships to 13. An emergency scrubbing system according to claim 1, including means for reversing the flow path of a gas stream therewithin.

14. An emergency scrubbing system according to claim 1, wherein said delay means include baffle means for reversing the flow path of a gas stream flowing through said delay means.

15. An emergency scrubbing system according to claim 1, including drain means disposed between said delay means and said treating substance reservoir for collecting reaction products from said delay means and conducting said reaction products into said treating substance reservoir.

16. An emergency scrubbing system according to claim 1, wherein said treating substance is disposed within said chamber at a level below said inlet and said outlet.

17. An emergency scrubbing system according to claim 1, wherein said sensor means is a chlorine sensor.

18. An emergency scrubbing system according to claim 1, wherein said sensor is a sulfur dioxide sensor.

19. An emergency scrubbing system according to claim 1, wherein said sensor is an ammonia sensor.

20. An emergency scrubbing system according to claim 1, wherein said sensor means is a pressure sensor.

21. An emergency scrubbing system according to claim 1 wherein said delay means includes a plurality of discontinuous walls.

* * * * *